US012737237B2

(12) United States Patent
Hopper

(10) Patent No.: US 12,737,237 B2
(45) Date of Patent: Sep. 15, 2026

(54) MANAGING WORKLOAD REQUESTS ON KUBERNETES CLUSTERS BASED ON DYNAMIC REQUESTS TO A CLOUD PROVIDER AND METHODS AND SYSTEMS FOR THE SAME

(71) Applicant: T-Mobile USA, Inc., Bellevue, WA (US)

(72) Inventor: Justin Carl Hopper, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 695 days.

(21) Appl. No.: 18/312,447

(22) Filed: May 4, 2023

(65) Prior Publication Data

US 2024/0370306 A1 Nov. 7, 2024

(51) Int. Cl.

*G06F 9/46* (2006.01)
*G06F 9/50* (2006.01)

(52) U.S. Cl.

CPC .......... *G06F 9/5077* (2013.01); *G06F 9/5055* (2013.01); *G06F 9/5094* (2013.01); *G06F 2209/501* (2013.01); *G06F 2209/5019* (2013.01); *G06F 2209/5022* (2013.01); *G06F 2209/505* (2013.01)

(58) Field of Classification Search

None

See application file for complete search history.

(56) References Cited

U.S. PATENT DOCUMENTS

| | | | | |
|---|---|---|---|---|
| 8,140,678 | B2 | 3/2012 | Fleischer et al. | |
| 8,370,448 | B2 | 2/2013 | Galchev | |
| 9,026,658 | B2 | 5/2015 | Xu et al. | |
| 9,317,334 | B2 | 4/2016 | Xu et al. | |
| 9,634,956 | B2 | 4/2017 | Xu et al. | |
| 9,658,895 | B2 | 5/2017 | Breternitz et al. | |
| 9,847,918 | B2 | 12/2017 | Kruse et al. | |
| 10,055,262 | B1 | 8/2018 | Thomas | |
| 11,228,510 | B2 | 1/2022 | Kruse et al. | |
| 11,616,686 | B1 * | 3/2023 | Chandrachood | G06F 9/5005 709/220 |
| 11,665,090 | B1 | 5/2023 | Banerjee et al. | |

(Continued)

FOREIGN PATENT DOCUMENTS

| | | | |
|---|---|---|---|
| CN | 106575245 | B | 12/2020 |
| CN | 113906716 | A | 1/2022 |

(Continued)

*Primary Examiner* — Bing Zhao

(74) *Attorney, Agent, or Firm* — Ashurst Perkins Coie US LLP

(57) ABSTRACT

Systems and methods for management of workloads within container orchestration systems associated with cloud systems are disclosed herein. A first request for at least one additional node from a cloud provider can be transmitted. Based on the first request, a first set of one or more node addresses can be received. Control plane network connections between control plane nodes can be configured. A workload processing request can be received. Based on generating an estimate of required resources for the workload processing request, a second request for at least one additional node can be transmitted. Based on receiving a second plurality of node identifiers, a worker node group can be configured.

20 Claims, 8 Drawing Sheets

(56) References Cited

U.S. PATENT DOCUMENTS

| | | | | |
|---|---|---|---|---|
| 2006/0173993 | A1* | 8/2006 | Henseler | G06F 8/63 709/224 |
| 2020/0244721 | A1 | 7/2020 | S et al. | |
| 2022/0164229 | A1 | 5/2022 | Sahasranamam et al. | |
| 2022/0166690 | A1 | 5/2022 | Kruse et al. | |
| 2022/0279034 | A1 | 9/2022 | Amacker et al. | |
| 2022/0318060 | A1 | 10/2022 | Choochotkaew et al. | |
| 2023/0161631 | A1 | 5/2023 | Sharma et al. | |
| 2024/0103896 | A1* | 3/2024 | Jiang | G06F 16/21 |
| 2024/0231873 | A1* | 7/2024 | Jigalur | G06F 9/45558 |

FOREIGN PATENT DOCUMENTS

| | | | |
|---|---|---|---|
| CN | 113918270 | A | 1/2022 |
| DE | 112020000054 | T5 | 3/2021 |
| EP | 3308271 | A1 | 4/2018 |
| EP | 3069228 | B1 | 9/2018 |
| EP | 2583211 | B1 | 4/2020 |
| EP | 3180694 | B1 | 6/2021 |
| WO | 2011159842 | A2 | 12/2011 |
| WO | 2015070236 | A1 | 5/2015 |
| WO | 2016200921 | A1 | 12/2016 |
| WO | 2018044341 | A1 | 3/2018 |
| WO | 2018151661 | A1 | 8/2018 |
| WO | 2020226979 | A2 | 11/2020 |

* cited by examiner

MANAGING WORKLOAD REQUESTS ON KUBERNETES CLUSTERS BASED ON DYNAMIC REQUESTS TO A CLOUD PROVIDER AND METHODS AND SYSTEMS FOR THE SAME

BACKGROUND

Container orchestration automates the provisioning, deployment, networking, scaling, availability, and lifecycle management of containers. Today, Kubernetes is the most popular container orchestration platform, and most leading public cloud providers offer managed Kubernetes services. Kubernetes is an open-source container orchestration system for automating software deployment, scaling, and management. Kubernetes works with "containerd," and CRI-O. Kubernetes defines a set of building blocks ("primitives") that collectively provide mechanisms that deploy, maintain, and scale applications based on CPU, memory or custom metrics. Kubernetes is loosely coupled and extensible to meet different workloads. The internal components as well as extensions and containers that run on Kubernetes rely on the Kubernetes API. The platform exerts its control over compute and storage resources by defining resources as Objects, which can then be managed as such.

Kubernetes follows the primary/replica architecture. The components of Kubernetes can be divided into those that manage an individual node and those that are part of a control plane. A Kubernetes master node handles the Kubernetes control plane of the cluster, managing its workload and directing communication across the system. The Kubernetes control plane consists of various components, each its own process, that can run both on a single master node or on multiple masters supporting high-availability clusters.

BRIEF DESCRIPTION OF THE DRAWINGS

Detailed descriptions of implementations of the present invention will be described and explained through the use of the accompanying drawings.

Figure 1:
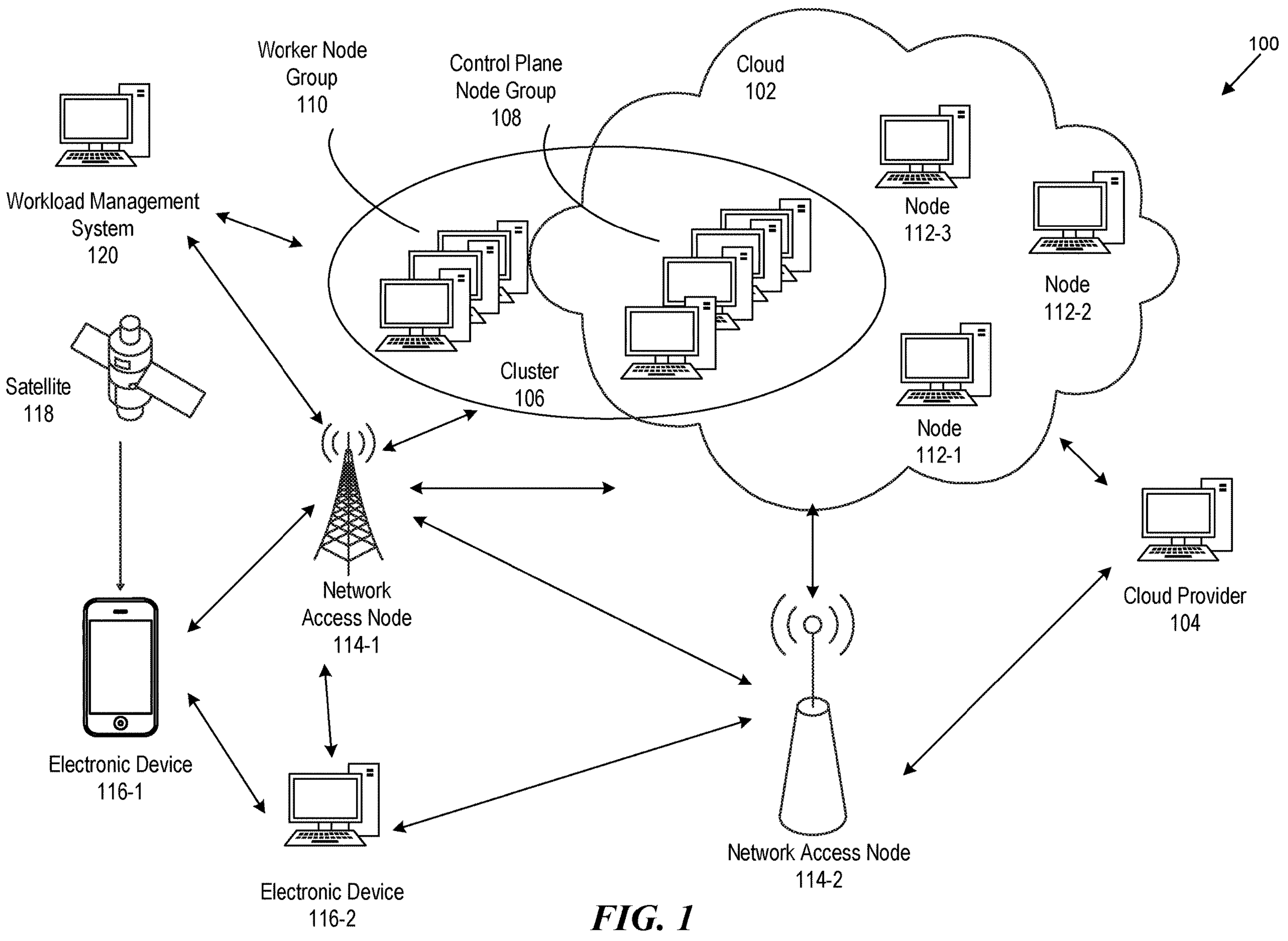
FIG. 1 is a diagram illustrating a network capable of communicating with electronic devices and clusters managed by a cloud provider.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Methods and systems disclosed herein relate to managing containerized workloads within clusters managed by cloud providers. For example, disclosed systems request resources for control plane nodes and worker nodes from a cloud provider and configure such nodes for processing workloads. In some implementations, the system enables management of nodes used to process workloads based on the size and performance required for processing. For example, the system can request additional nodes in situations where further processing power is required, while the system can deactivate nodes where system resources are underused. By doing so, the system can enable flexible and efficient management of system resources for improved execution of workloads on containerized virtual machines.

In conventional systems, cloud services may implement automatic scaling, where the amount of computational resources in a server is dynamically adjusted based on usage or load within the server. For example, the number of nodes used to run a web application may be increased or decreased based on the number of active users on the website. In conventional systems, such a node provisioning system can be used for Kubernetes-based clusters, where individual virtual machines (e.g., which can include containerized applications within these virtual machines) are provided for use as control plane nodes and/or worker nodes. Virtual machines can be grouped together to form a cluster, enabling operation as a Kubernetes-enabled system. However, such groupings are subsequently managed by the cloud provider itself, based on rules or procedures defined by the cloud provider. For example, cloud providers may provision nodes and resources based on usage, and decisions for adding or removing resources to a cluster may be managed by rulesets that underpin grouping paradigms, such as virtual machine scale-sets, managed instance groups, or autoscaling groups. As a result of cloud provider-level control of nodes within a cluster, certain nodes that are desirable for operation within a cluster may be deactivated or deprovisioned unexpectedly.

As an illustrative example, control plane nodes may be required to orchestrate workload management by the Kubernetes cluster. Such control plane nodes may be temporarily deactivated, such as where cluster management tasks do not require immediate attention. In response to detecting lower computational usage, the corresponding cloud provider, in conventional systems, may remove the control plane node from the Kubernetes cluster, having detected low resource usage. However, the control plane may still be a required component of the system to ensure functioning of future workload management, despite a temporary reduction in processing activity. As a result, the cloud-service provider's management of a cluster can lead to impediments in the smooth functioning of the system, thereby requiring cloud provider-tailored solutions or configurations to prevent such interference by the cloud system.

To solve the technical problem caused by management of clusters by cloud providers, the methods and systems disclosed herein enable management cluster-based architectures independent of the corresponding cloud provider. For example, the system enables generation and configuration of control plane nodes based on nodes provisioned by the control plane node. Configured control plane nodes can, subsequently, request nodes for workload processing from the cloud provider based on workloads submitted to the system. By doing so, the system enables flexible deployment of clusters in a modular manner, where internal management of the container orchestration system does not need to be specifically configured for compatibility with a given cloud provider (e.g., thereby avoiding "cloud lock-in"). For example, the system disclosed herein prevents the cloud provider from deprovisioning or provisioning system resources without direction from the container orchestration system itself, thereby enabling management of control plane nodes and worker nodes without prejudice to compatibility with the cloud provider. Solving these technical issues enables the container orchestration system to manage resources internally, without intervention by the cloud provider. As such, the system enables more portable, efficient, and robust operation of container orchestration architectures on cloud provider-based systems.

In disclosed implementations, the system can transmit a request for another node to be provisioned via a cloud provider, for use in the cluster. Based on this request, the system receives information regarding nodes that are available for use by the cluster, such as a list of node addresses referring to available nodes. The system can configure some of these nodes as control plane nodes, including corresponding network connections between these nodes. As such, the system receives requests for processing of workloads, which include information regarding the nature or size of workloads to be processed. Based on this information, the system generates an estimate of required resources and request nodes that satisfy this estimate from the cloud provider. The system provisions nodes that are indicated to be available by the cloud provider as worker nodes to process the workloads, thereby enabling native management of computational resources for workload processing.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Cluster Management System

FIG. 1 is a diagram illustrating a network 100 that includes a cloud 102 capable of communicating with electronic devices 116-1 and 116-2 and a cluster 106 managed by a cloud provider 104. For example, a cloud provider 104 manages or provisions a cloud 102, which includes nodes 112-1, 112-2 and 112-3. In some embodiments, the cloud 102 includes one or more clusters (e.g., cluster 106) of nodes, which can include further subdivisions of nodes, such as a control plane node group 108 and/or a worker node group 110. The cloud 102 communicates, through network access nodes 114-1 or 114-2, with electronic devices 116-1 and 116-2. Additionally or alternatively, electronic devices 116-1 and/or 116-2 are capable of communicating with a satellite 118.

The cloud 102 can include one or more devices, systems or components capable of delivering services over a network (e.g., the Internet). For example, the cloud 102 includes one or more hardware or software components capable of communication with each other and/or other devices. The cloud 102 can include one or more nodes (e.g., nodes 112-1 through 112-3). The cloud 102 can include cloud storage, including storage media over multiple servers or devices. Additionally or alternatively, the cloud 102 includes computing power (e.g., processors) capable of executing programs or scripts. Such storage media or computing power can be associated with one or more nodes (e.g., nodes 112-1 through 112-3). The cloud 102 can enable devices external to the cloud (e.g., electronic devices 116-1 and/or 116-2) to access, store, or process information stored on associated nodes or devices, for example through one or more application programming interfaces (APIs) via one or more network access nodes 114-1 through 114-2.

In some implementations, the cloud 102 is managed by a cloud services manager, such as a cloud provider 104. A cloud services manager or a cloud provider can include an entity responsible for acquiring, managing, and/or provisioning computing infrastructure for one or more clouds, such as cloud 102. For example, cloud provider 104 includes cloud software that enables management and preparation of cloud resources, such as nodes, within the cloud. An API, accessible to external devices, can provide an interface between the cloud provider 104 and one or more electronic devices 116-1 or 116-2. Examples of cloud providers include Amazon Web Services, Azure, and IBM Cloud. In some implementations, clusters can be managed by other hardware provisioning systems, such as on-prem systems that provide virtual machines or other types of computer infrastructure. The cloud provider 104 can enable management of cloud resources for various electronic devices or users. In some implementations, the cloud provider 104 assigns one or more node addresses corresponding to nodes for use by particular entities, and/or deprovision such nodes from use. By doing so, the cloud provider 104 enables efficient management of computational resources for multiple users of the cloud 102. However, for clusters that include containerized applications, the cloud provider 104 can cause sudden or undesired modifications to provisioned resources. For example, the cloud provider 104 erroneously re-assigns resources or add unnecessary nodes to the cluster, thereby contributing to instability and volatility in operation of such clusters. As such, systems and methods disclosed herein enable flexible operation of containerized applications within such clusters in the cloud 102.

For example, the cloud 102 includes various nodes 112-1 through 112-3 that may be provisioned to users. A node can include one or more hardware components (e.g., as in a computing device or a terminal) or software components (e.g., as in a virtual machine) that can act as a single machine within a cluster. In some implementations, a node includes memory/storage (e.g., random access memory and/or non-volatile memory) and/or computational power (e.g., one or more central processing units, graphics processing units, and/or processors). Nodes 112-1 through 112-3 can be associated with a cluster and/or can be provisioned to one or more users. Each node can include a node address serving to identify the node. Additionally or alternatively, a node exhibits performance characteristics, such as usage metrics and/or remaining storage capacity metrics, as further discussed in relation to FIG. 2B. Such performance characteristics can be associated with particular types of nodes, which can specify node architecture, performance, and/or capabilities. In some cases, nodes include one or more virtual machines or containerized applications that are grouped together in pods, sharing resources such as storage, IP addresses, and/or processing workflows. Nodes enable containerized application-based architectures, such as Kubernetes, to flexibly and predictably provision resources for processing workloads, as individual nodes can be configured in a modular, consistent manner.

The cloud provider 104 can determine or identify one or more nodes as available or unavailable. An available node can include a node that has not been assigned to one or more users or clusters and is otherwise provisioned for processing workloads or processes. For example, an available node is a node that is not currently processing workloads. By marking nodes as available, the cloud provider system enables determination of resources available for provisioning to entities or clusters requesting resources.

Nodes 112-1 through 112-3, as well as nodes within the control plane node group 108 and/or the worker node group 110, can be associated with node addresses. A node address can indicate an address (e.g., a location, identifier, or marker) of the given node within a network. For example, a node address includes a name, number, or alphanumeric identifier that identifies a specific node (e.g., a computing device, virtual machine or terminal) within the network 100 (e.g., within the cloud 102). A node address can include an Internet Protocol address referring to the given node, and/or a media access control (MAC) address referring to the physical address of a device associated with the given node. In some implementations, the node address includes an identifier of a virtual machine on a computing device. By assigning or determining node addresses corresponding to nodes within the cloud 102, the cloud provider 104 enables tracking of used and available nodes within the machine, thereby allowing for provisioning of nodes to entities requesting such resources.

Nodes can be incorporated within clusters, such as the cluster 106. A cluster can include any grouping, combination, or organization of nodes. For example, a cluster includes a group of virtual machines, computing devices and/or servers. In some implementations, nodes within a cluster communicate using local area networks, with each node running its own instance of an operating system. For example, nodes within a cluster exhibit similar hardware, operating systems and/or software, and/or are provisioned for the same purpose or within a similar architecture. For example, the cluster management system 120 configures the cluster 106 to run containerized applications, as in a Kubernetes-type container orchestration system. Clusters can include subgroups of nodes, such as the control plane node group 108 and/or the worker node group 110. Nodes within the cluster 106 can be within the cloud 102 and/or managed or provisioned by cloud provider 104. Additionally or alternatively, nodes within the cluster 106 reside externally to the cloud 102 (e.g., can be provisioned through a client device or an entity unaffiliated with the cloud provider). Additionally, nodes can be managed or provisioned by any hardware provisioning system, such as "on-prem" systems, which can include virtual machines that act as nodes. Nodes within such subgroups can have different purposes. By modularizing computations using nodes, clusters enable complex operations, such as processing of workloads, in scalable systems. For example, such clusters enable Kubernetes-type container orchestration, as well as high-performance distributed computing, for improvements in efficiency and scalability of processing tasks.

In disclosed embodiments, a cluster management system 120 enables provisioning of nodes within the cluster 106 for processing tasks. For example, the cluster management system 120 includes one or more computing devices capable of managing workloads that are executable by the cluster 106. The cluster management system 120 can request nodes from one or more cloud providers (e.g., cloud provider 104), provision and/or configure nodes for processing workload processing requests, evaluate nodes (e.g., nodes of the cluster 106) for required resources, and generate requests for modifying resources assigned to the cluster 106 by the cloud provider 104. In some embodiments, the cluster management system 120 resides on one or more electronic devices (e.g., electronic devices 116-1 or 116-2). Additionally or alternatively, the cluster management system 120 includes a standalone system that is capable of communicating with one or more network access nodes 114-1 or 114-2 and/or the cloud provider 104. As an illustrative example, the cluster management system 120 resides within a computer or a device that is within the cloud 102 but not included within the cluster 106, such as one of nodes 112-1 to 112-3. The cluster management system 120 can reside within and/or communicate with one or more nodes within the cluster 106. In some embodiments, the workload management 120 communicates with nodes within the control plane node group 108 and/or the worker node group 110 using an API.

The cluster management system 120 can provision the cluster 106 as a container orchestration system. Container orchestration can include any technique, system, or architecture whereby containers can be provisioned, deployed, networked, scaled or managed. Containers can include lightweight, executable application components that combine application source code with all operating system libraries and dependencies required to run the code in more than one environment. In some implementations, a container can include virtual machines, containerized microservices, or serverless functions. As an illustrative example, a container orchestration system includes Kubernetes systems, which can include container orchestration that include functionalities such as container deployment, rollouts, service discovery, storage provisioning, load balancing and scalability, self-healing, and portability across multiple cloud providers. While Kubernetes systems, as well as other container orchestration systems, benefit from the flexibility and scalability of the cloud 102, such systems may flexibly manage resources in a manner that is inconsistent or incompatible with decisions made by the cloud provider 104. As such, methods and systems disclosed herein enable increased control by container orchestration systems operating on clusters managed by cloud services managers.

Container orchestration systems, such as Kubernetes clusters, include control plane nodes, which can reside within the control plane node group 108. A control plane node includes a node (e.g., a machine, virtual and/or physical) that enables management of other nodes within a container orchestration cluster. For example, control plane nodes make decisions about the given cluster, including scheduling workload processing tasks, scaling deployments and enforcing policies. In some implementations, a control plane node monitors the health of the cluster, updates services, and/or responds to cluster events. For example, a control plane node communicates with worker nodes, pods, or services, as well as API servers, secure shell (SSH) tunnels, and/or other control plane network connections. In some cases, a group of control plane nodes (e.g., the control plane node group 108) include ones or more control plane nodes, of one or more types of control plane nodes. One or more control plane nodes of the control plane node group 108 can reside within the cloud 102. Additionally or alternatively, one or more control plane nodes can reside outside of the cloud 102 (e.g., can be associated with computing devices or user devices that are not within the cloud 102). For example, a Kubernetes cluster's control plane node group includes an odd number of control plane nodes. By including more than one control plane node within a control plane node group, the system disclosed herein ensures that, in the case of failure or unavailability of one or more control plane nodes, a backup node can take over control plane responsibilities.

The cluster 106 can include one or more worker nodes (e.g., within the worker node group 110). A worker node includes nodes that run containerized applications on container orchestration systems. For example, a worker node includes one or more virtual machines in order to process workloads or other processes. Worker nodes can include interfaces for communication with worker nodes or control plane nodes (e.g., kubelet), enabling communication with, for example, API servers running on the control plane node. For example, worker nodes enable processing or running of one or more containerized applications (e.g., as in a pod). Worker nodes can be scaled up or down (e.g., further worker nodes can be added to the worker node group 110) based on measured resource usage and/or the nature or type of requested resources. The control plane node group 108 controls, manages, and/or executes tasks through worker nodes within the worker node group 110. One or more worker nodes within the worker node group 110 can reside within the cloud 102. Additionally or alternatively, one or more worker nodes can reside outside of the cloud 102 (e.g., can be associated with computing devices or user devices that are not within the cloud 102). As such, the cluster management system 120 manages required resources for cluster 106 for provisioning of both control plane nodes and worker nodes without direct input from the cloud provider 104. Thus, such container orchestration systems benefit from autonomy from cloud services managers by providing improved control to control plane nodes for provisioning of corresponding worker nodes within the cluster.

In some implementations, worker nodes are assigned to the cluster 106 but are indicated as inactive. Inactive nodes include nodes that are not processing workloads, executing processes, or completing any substantive tasks. For example, inactive nodes communicate with other entities and/or execute other secondary tasks, but are not be actively processing workloads or primary processes. By identifying such nodes (e.g., through determination of such nodes' processing unit usage percentage as being below a threshold value), the cluster management system 120 can determine whether to deprovision such resources, thereby improving cluster efficiency.

The cloud 102, including all components therein, can interact with electronic devices 116-1 or 116-2 through network access nodes 114-1 and/or 114-2. For example, the cloud 102 can communicate with other devices, computers and/or terminals through wireless or wired connections. A network access node (NAN) can include, for example, a base station. A base station is a type of network access node (NAN) that can also be referred to as a cell site, a base transceiver station, or a radio base station. The network 600 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

Such NANs can enable communication of the cloud 102 with electronic devices 116-1 and 116-2. An electronic device can include a wireless device. Wireless and electronic devices can be integrated with or embedded in other devices. As illustrated, the electronic devices are distributed throughout the network 100, where each electronic device 604 can be stationary or mobile. For example, electronic devices include handheld mobile devices (e.g., smartphones, portable hotspots, tablets, etc.); laptops; wearables; drones; vehicles with wireless connectivity; head-mounted displays with wireless augmented reality/virtual reality (AR/VR) connectivity; portable gaming consoles; wireless routers, gateways, modems, and other fixed-wireless access devices; wirelessly connected sensors that provides data to a remote server over a network; IoT devices such as wirelessly connected smart home appliances, etc.

Figure 2A:
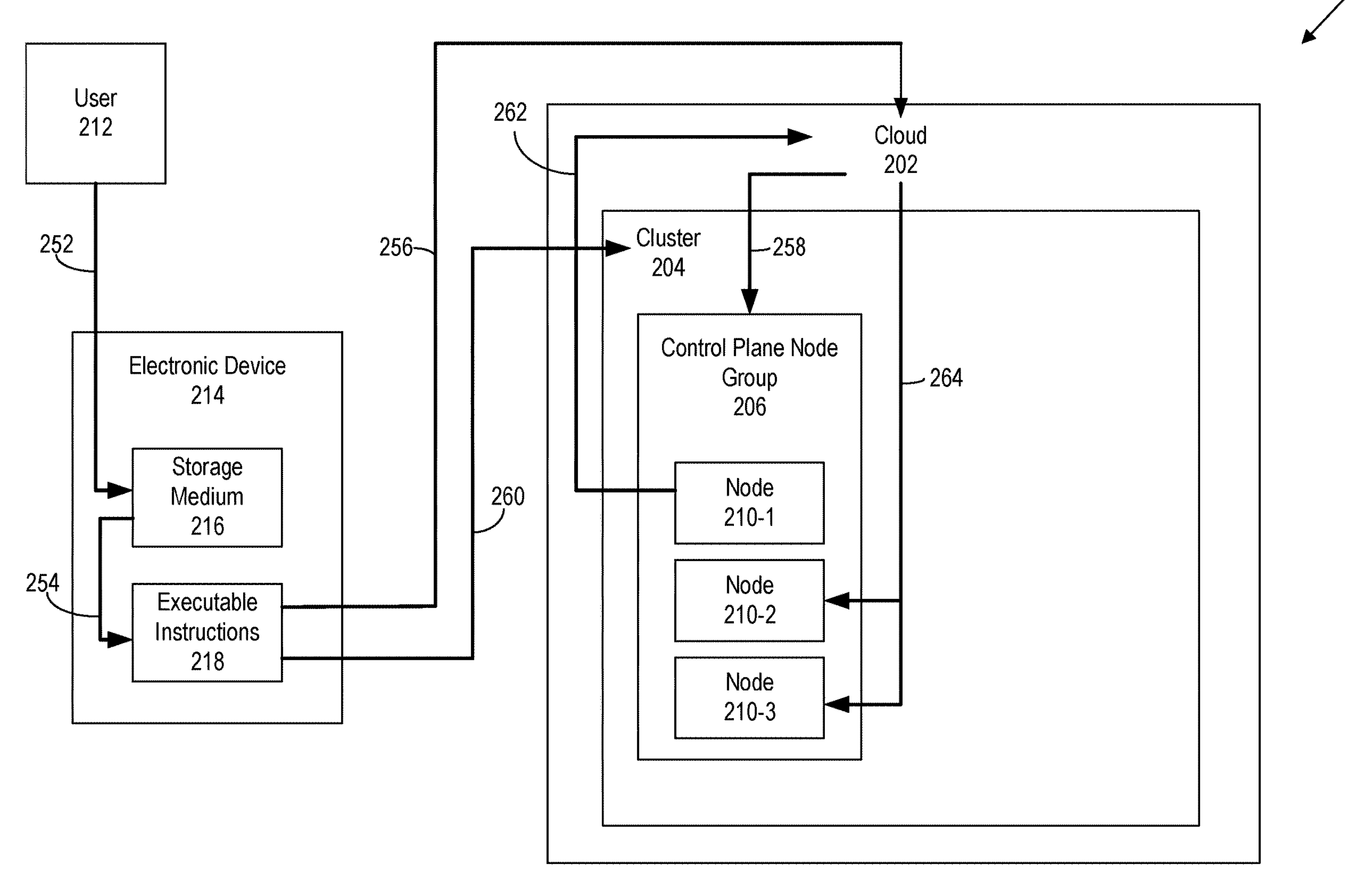
FIG. 2A is a diagram that illustrates a system for configuring control plane nodes within a cluster managed by a cloud provider.

FIG. 2A is a diagram that illustrates a system 200 (e.g., the cluster management system 120) for configuring control plane nodes within a cluster 204 (e.g., a container orchestration system) managed by a cloud provider. For example, the system includes a cloud 202, which enables provisioning of nodes for a cluster 204 and node groups (e.g., control plane node group 206) that include one or more nodes (e.g., nodes 210-1 through 210-3). The cloud 202 can be configured to communicate with an electronic device 214 operated by or interfacing a user 212. For example, the cluster management system 120 can reside within the electronic device 214 and/or the one or more nodes. As illustrated, the electronic device 214 includes a storage medium 216 and/or executable instructions 218.

At act 252, the electronic device 214 can receive a request from a user for configuration of a container orchestration system (e.g., a cluster 204) on the cloud 202. For example, the system receives a user request that includes details regarding the creation of the cluster 204, including a number of nodes requested, any software or hardware that is requested (e.g., a type of node requested), and/or storage requirements for the cluster. As illustrated, the electronic device 214 can store the request and such instructions in a storage medium 216.

At act 254, the electronic device 214 (e.g., through the executable instructions 218) can retrieve a binary for generation of the requested cluster. For example, the electronic device 214 retrieves and/or determines any programs, binaries, and/or information needed to configure the requested cluster 204. In some implementations, the electronic device 214 requests further information from the user 212 that may be missing from the user request.

At act 256, any binaries or other information determined by the electronic device 214 can be used to generate any required certificates (e.g., Kubernetes certificates for implementations of Kubernetes clusters), which can be transmitted to the cloud 202 through, for example, an API call. As an illustration, the electronic device 214 generates a request for cloud 202 to generate a load-balancer on a node (e.g., a kube-api load-balancer for Kubernetes systems) through transmission of a request for generation of a cluster, where the request for generation of the cluster includes configuration information relating to the cluster. For example, the transmission of the request for generation of the cluster includes binaries that can be executed on nodes provisioned by a cloud provider of the cloud 202 to generate and/or configure one or more control plane nodes. In some implementations, the request for generation of the cluster includes information regarding control plane network connections, as well as configuration metadata, which can include information regarding the type of requested nodes, any storage requests and/or processing power requirements.

At act 258, the cluster management system enables the cluster 106 to initialize one or more nodes to be designated as control plane nodes. For example, the system enables the cloud 102 to provision a control plane node 210-1 according to any configuration metadata and/or binaries included within the request for generation of the cluster, or further requirements specified or stored within the cloud 102. As an illustrative example, the cloud provider provisions the control plane node 210-1 with an API-based load-balancer as requested by the configuration metadata. By doing so, the system enables configuration of container orchestration systems within the cloud 102.

At act 260, the cluster management system enables the electronic device 214 to provision the node 210-1 with network connections to servers and/or networks external to the cloud 102 (e.g., a container network interface (CNI) plugin), as well as software or controllers that can enable control or management of the cluster subsequently. Alternatively or additionally, the cluster management system injects one or more custom resource definitions (e.g., a CRD) for a node group within the cluster 106, to enable further building of a control plane node group 206.

At act 262, software or controllers installed on the control plane node 210-1 can detect the CRD corresponding to the control plane node group and, accordingly, request that the cloud 202 build out the node group by transmitting a request that the cloud 202 provision at least one additional node (e.g., node 210-2 and/or node 210-3). For example, the cluster management system enables provision of such nodes according to specifications, configuration metadata, and/or other details provided by the user. By doing so, the system can provision enough control plane nodes to function as backstops in case of failure of the primary control plane node 210-1. In some implementations, the system maintains load-balancer backend programs to maintain stability of the container orchestration system upon receipt of workload requests.

At act 264, the cloud 202 can provision resources (e.g., additional nodes 210-2 and/or 210-3), and the cluster management system can configure these as further control plane nodes within the control plane node group 206. By providing the cloud 202 with requests of resources to be provisioned to the system, the cluster management system enables flexibility and modularity in nodes provisioned to the system, as in a container orchestration system, while enabling compatibility with the cloud 202 and corresponding cloud provider.

In disclosed implementations, the system configures control plane network connections. For example, control plane network connections can include connections between control plane nodes within the control plane node group, as well as between control plane nodes and the cloud 202, the associated cloud provider, and/or the electronic device 214. As an illustrative example, the system configures secure shell (SSH), HTTPS, or TLS connections between an API server on the node 210-1 and other control plane nodes 210-2 and 210-3. In some implementations, the cluster management system configures the load-balancer of node 210-1 to communicate with the nodes 210-2 and 210-3 to enable improved availability of control plane nodes by enabling the distribution of traffic across multiple instances of the control plane nodes.

For example, the system configures an internal load balancer for management of network connections, which can be responsible for routing requests between containers of the same cloud 102. The internal load balancer can enable the container orchestration system to be accessible only to a private IP address, to improve security to corresponding containerized applications or for internal communication within the cluster. In some implementations, the system provisions external load balancers, which can enable the routing of requests from outside the cluster to appropriate pods or services inside the cluster. For example, an external load balancer receives a request, at the control plane node 210-1, and determine another control plane node (e.g., one of nodes 210-2 or 210-3) to which to reroute the request, depending on the cluster status (e.g., control plane node processing unit usage). In some cases, the system provisions an ingress controller at a control plane node, which can be responsible for routing requests based on rules defined in an ingress resource (e.g., for HTTP or HTTPS traffic into the cluster). By configuring network connections between control plane nodes (and, alternatively or additionally, with external systems, clusters, or devices), the system enables distribution of traffic to or between control plane nodes in an efficient manner, as well as to other nodes within the cluster and/or cloud.

In some implementations, the system configures the one or more control plane nodes (e.g., nodes 210-1 through 210-3) according to configuration metadata, such as configuration metadata included in the request for generation of the cluster of virtual machines. The configuration metadata can include information regarding the nature and size of the nodes and corresponding containers and/or virtual machines requested from the cloud services manager. For example, the configuration metadata includes a number of requested control plane nodes. The configuration metadata can specify a specific number of requested nodes (e.g., three), and/or specify ranges or rules for provision of such nodes (e.g., a request for provision of an odd number or even number of control plane nodes). In some implementations, the configuration metadata includes an indication of a type of node. For example, a type of node includes an indication of a processor type (e.g., a number of cores, threads, processor architecture, and/or instruction set architectures). By enabling specification of particular configurations for generation of the container orchestration system, the cluster management system enables flexibility and modularity within the control plane node group, thereby improving efficiency and robustness for the system's intended applications.

Figure 2B:
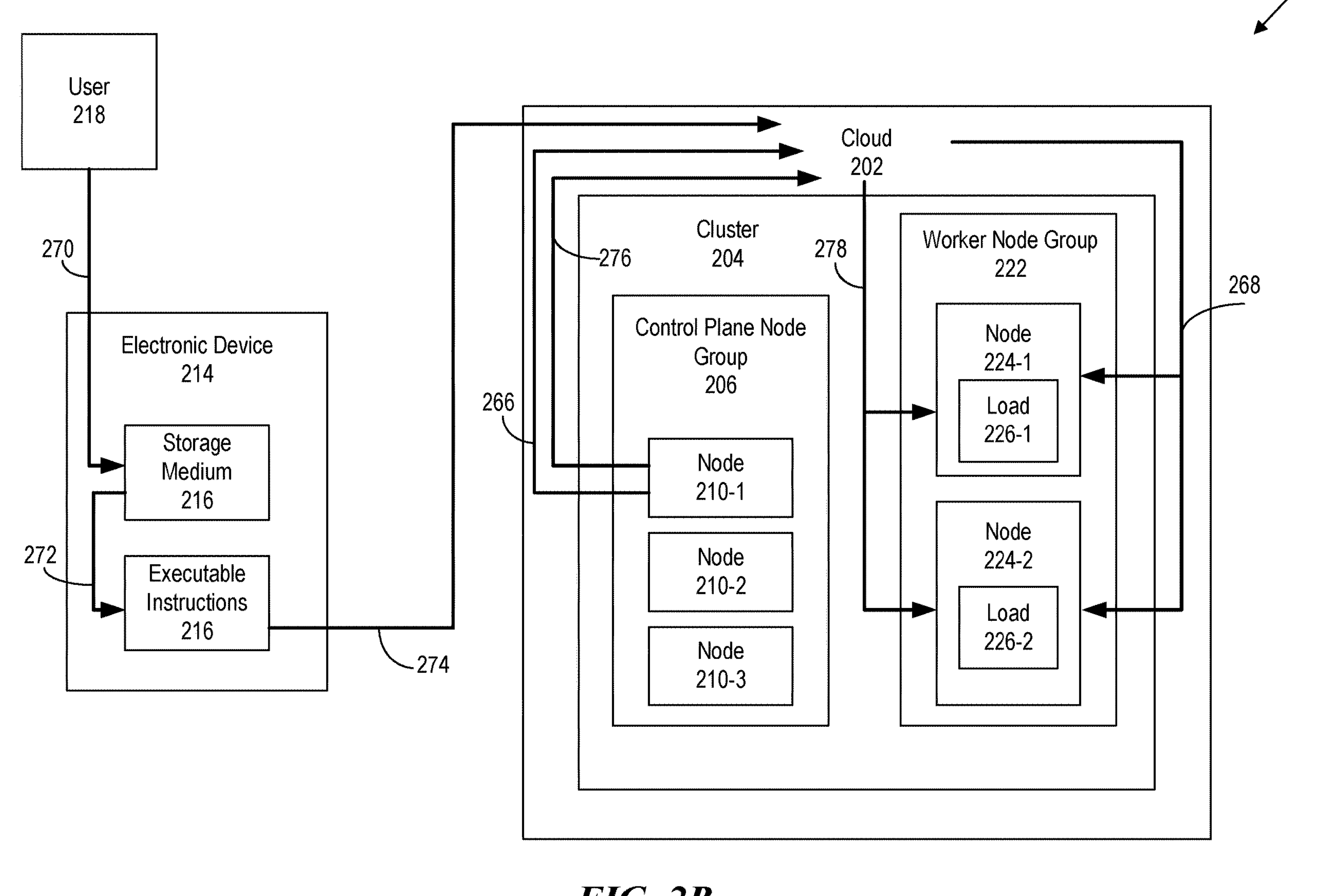
FIG. 2B is a diagram that illustrates a system for configuring worker nodes within a cluster managed by a cloud provider.

FIG. 2B is a diagram that illustrates a system 220 (e.g., a cluster management system) for configuring worker nodes within a cluster managed by a cloud provider, using one or more components described herein. For example, the cluster management system can further include a worker node group 222, and one or more nodes 224-1 and/or 224-2 provisioned to process or execute one or more loads 226-1 and/or 226-2.

At act 266, the control plane node 210-1 (e.g., through an API associated with the node) can submit a request to the cloud 202 (e.g., an associated cloud services manager) for provisioning of one or more worker nodes within a worker node group. For example, the control plane node 210-1 requests these nodes based on a workload processing request that indicates processes to be executed by the container orchestration system.

In disclosed implementations, a workload processing request includes a request, for example, from the user 212, for execution of one or more processes (e.g., workloads) on the container orchestration system. For instance, the workload processing request includes an indication of one or more requested processes, which can include executable binaries, a package of files, programs, software, executable instructions, and/or data structures. The workload processing request includes information regarding the configuration of pods and/or containers to be used, and can include requests to run workloads, such as stateless applications, stateful applications, batch jobs, and/or daemon sets (e.g., monitoring agents, logging agents, and network plugins). In disclosed implementations, a workload includes an application running on a container or group of containers (e.g., a pod) within the container orchestration system. For example, a workload is containerized software that is executed on a cluster but does not contribute to management of the cluster itself.

The cluster management system disclosed herein can determine, based on the workload processing request, determine an estimate of required resources. For example, an estimate of required resources can include, for a given workload, an estimate of processing power required or requested (e.g., a number of processors, a clock speed, a number of cores per processor, a number of threads per core, and/or a type of processor). In some implementations, the estimate of required resources includes a memory or storage requirement, such as an amount of random-access memory or hard-disk storage required for the given workload. The estimate of required resource includes an estimate of a run-time for the workload (e.g., a time for which the application and/or process is expected to be active). By determining an estimate of resources required, the system can generate a request to the cloud services manager for additional resources for processing the given workload based on this estimate, enabling sufficient resource allocation to the container orchestration system.

In disclosed implementations, the system requests further resources and/or request deprovision of resources based on node usage metrics for nodes within the worker node group. Node usage metrics can include any metric, measure, or characteristic of one or more nodes relating to the node's usage, such as in relation to the node's capacity. For example, a node usage metric includes an indication of a percentage of processing unit usage (e.g., for a central processing unit or a graphics processing unit). In some cases, a node usage metric includes an indication of memory and/or storage associated with a node, such as an indication of a percentage of memory or storage used with respect to the node's total memory or total storage respectively. For example, the system tracks node usage metrics periodically over time (e.g., every few minutes) and make such reallocation decisions accordingly. Based on such a reallocation decision, the system generates a request to the system for new resources and/or for deprovisioning of resources. By tracking the node usage of nodes, such as worker nodes, the cluster management system can redistribute and/or reallocate resources accordingly in real time, improving system reliability and efficiency.

In some implementations, the cluster management system compares the node usage metrics for worker nodes (or any node) with a threshold usage metric and determine a number of worker nodes that exhibit a lower node usage metric than the threshold usage metric. By identifying such nodes (e.g., by generating a list of node identifiers corresponding to these nodes), the system enables a determination of which nodes are underused or used in an inefficient manner. For example, the system determines a number of worker nodes that exhibit such low usage metrics and compares this number to one or more maximum threshold numbers to determine which worker nodes to deactivate. For example, based on this list of node identifiers, the system redirects or redistributes processing tasks from these nodes to other nodes and determines to deactivate these worker nodes whose tasks were redistributed. Thus, the cluster management system conserves system resources and enables more efficient use of nodes that are provisioned to the container orchestration system (e.g., the cluster).

Additionally or alternatively, the cluster management system determines nodes that exhibit a higher node usage metric than the threshold usage. Based on the number of these nodes that surpass one or more maximum threshold numbers, the system requests further nodes. Thus, for workloads for which the provisioned resources are insufficient or unsatisfactory, the cluster management system can generate a request for further resources accordingly.

At act 268, the cloud 202 (e.g., through an API associated with the cloud services manager) can provision the worker node group 222 with one or more worker nodes 224-1 and/or 224-2, based on the workload processing request described above. For example, the cloud 202 transmits, to a load balancer associated with node 210-1 using the one or more configured network connections, a list of node identifiers that correspond to nodes available for use as worker nodes. The cluster management system can, accordingly, run one or more workloads (e.g., loads 226-1 or 226-2) corresponding to the workload processing request.

The cluster management system can enable updates to software and/or operating systems associated with nodes or virtual machines (e.g., worker nodes). For example, at act 270, a user, such as the user 212, submits a request to update the worker node group or the control plane node group with an updated operating system image. For example, the request can be to update virtual machine software, such as operating system software. The request is submitted, for example, through the electronic device 214, and stored within the storage medium 216. In disclosed implementations, an operating system image includes a snapshot or copy of files, configurations and/or settings of a computer system. For example, an operating system image can be used to update virtual machine software associated with virtual machines or nodes, which can include an operating system, or a program or application that emulates a computer system. For example, a node and/or a container comprises one or more virtual machines that run virtual machine software, such as operating systems. By receiving operating system images for updating virtual machine software, the system enables reconfiguration or updates to worker nodes or control plane nodes, improving the flexibility of the container orchestration system for handling a variety of workload processing requests.

At act 272, the cluster management system can generate executable instructions (e.g., the executable instructions 218) for propagating the operating system image to the container orchestration system. At act 274, the electronic device 214 can transmit this operating system image and respective executable instructions 218 to the cloud 202 (e.g., through an API associated with the cloud services manager), which can relay these instructions to the load-balancer associated with a control plane node (e.g., control plane node 210-1). At act 276, the control plane node can submit a request to the cloud 202 to update virtual machine software associated with worker nodes 224-1 or 224-2 with the operating system image. Additionally or alternatively, the control plane node can submit a request to the cloud 202 to update virtual machine software (e.g., operating systems associated with containers) associated with control plane nodes 210-1 to 210-3. At act 278, the cloud 202 can propagate these updates to the worker nodes and/or control plane nodes, thereby enabling updates to nodes through the cluster management system.

Figure 3:
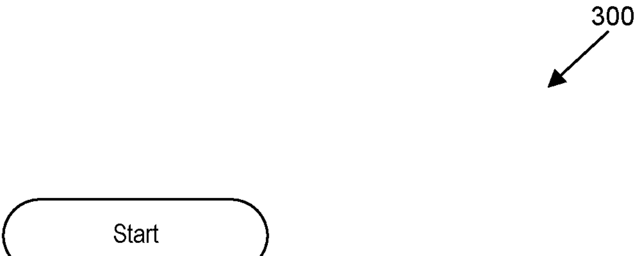
FIG. 3 is a flowchart that illustrates configuration of a control plane node group and of a worker node group.
Figure 3:
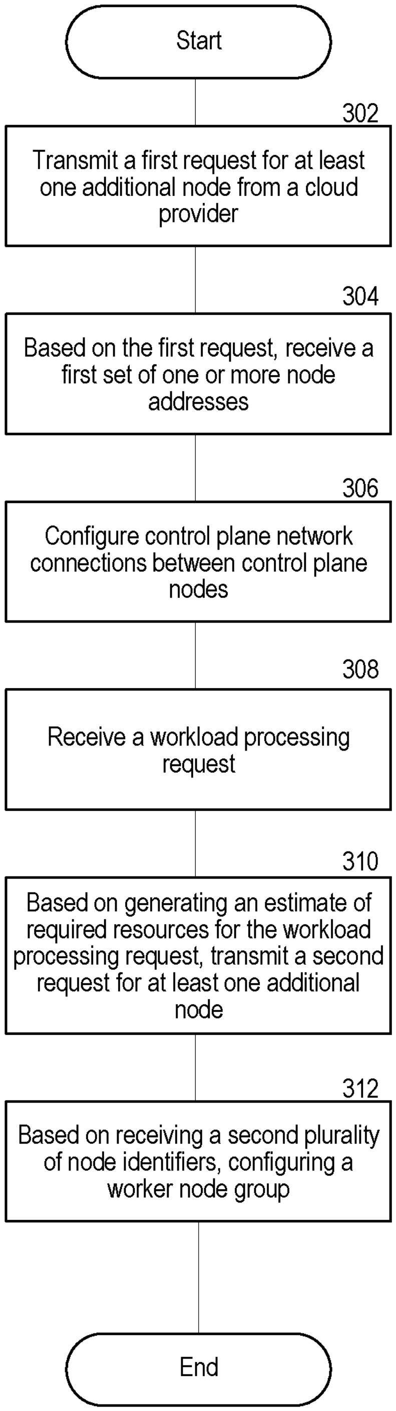

FIG. 3 depicts a flowchart 300 that illustrates configuration of a control plane node group and of a worker node group. For example, the methods disclosed in relation to the flowchart 300 can be used to configure a Kubernetes cluster and/or other container orchestration system for operation within a cloud. At the request of the cluster management system, the cloud provider can provision a first node (e.g., node 210-1) associated with the cloud 202 for building the associated container orchestration system.

At act 302, the cluster management system can transmit a first request for at least one additional node from a cloud provider. For example, the cluster management system generates a request and transmit this request to the cloud 202 (e.g., through an associated API call) to generate a cluster 204 as a container orchestration system. By doing so, the cluster management system enables generation of control plane nodes that can be used to manage and distribute workloads across containers and/or respective nodes.

In disclosed embodiments, the cluster management system generates the request for at least one additional node based on configuration metadata received from a user. For example, the system receives a request for generation of a cluster of virtual machines, where the request for generation of the cluster of virtual machines includes configuration metadata. The system extracts, from the configuration metadata, a number of requested control plane nodes. Based on comparing the number of requested control plane nodes with a number of the nodes available for use, the system can transmit, to the cloud provider, the first request for at least one additional node. As an illustrative example, the system receives, from the user 212, a request for a particular number of control plane nodes to be provisioned within the container orchestration system (e.g., a Kubernetes system), such as a request for three control plane nodes. As such, the system enables control and flexibility in the configuration of the container orchestration system within the cloud 202.

In disclosed embodiments, the system generates this request for at least one additional node by specifying a type of node requested. For example, the system extracts, from the configuration metadata, a type of requested control plane nodes. Based on comparing the type of requested control plane nodes with a type of the nodes available for use, the system transmits a third request to the cloud provider for additional nodes of the type of requested control plane nodes. For example, the system enables a user to specify, within the configuration metadata, a type of requested control plane node (e.g., a processor type and/or specifications associated with the processor), in order to improve the flexibility and adaptability of the container orchestration system for a variety of use cases.

At act 304, the cluster management system can, based on the first request, receive a first set of one or more node addresses. For example, based on the first request, the system receives, from the cloud provider, a first set of one or more node addresses identifying available nodes. In some implementations, the system receives a set, list, or data structure of any type of node identifier. By receiving such a set of identifiers, such as from cloud 202, the system identifies nodes available for use by the container orchestration system for control plane node configuration, thereby enabling the cluster management system to build, for example, a Kubernetes system controlled by control plane nodes. The node addresses provided can, for example, correspond to nodes requested within the configuration metadata discussed above.

At act 306, the cluster management system can configure control plane network connections between nodes associated with the set of one or more node addresses (e.g., nodes 210-1 through 210-3). For example, the system configures control plane network connections between control plane nodes of a control plane node group. In disclosed implementations, the control plane node group includes the first node and nodes with addresses corresponding to the first set of one or more node addresses. For example, the system sets up any connections between nodes provisioned to the container orchestration system that can aid in distribution and/or management of tasks associated with containerized applications. By doing so, the cluster management system can set up the orchestration environment to accept workload requests for subsequent processing.

At act 308, the cluster management system can receive a workload processing request (e.g., from a user 212). For example, the workload processing request includes an indication of requested processes to be executed. As discussed above, these processes can include binaries, executable instructions, files, data structures, and/or applications (e.g., containerized applications) to be executed on nodes within the container orchestration system. By doing so, the system enables dynamic receipt, handling, and subsequent processing of user workload requests.

At act 310, based on generating an estimate of required resources for the workload processing request, the cluster management system can transmit (e.g., to a cloud provider) a second request for at least one additional node. For example, as discussed above) based on the workload processing request, the system determines resources (e.g., processors, memory, storage, and/or time-related requirements) that are required or desired for processing of the associated workloads and/or processes. In disclosed implementations, the system determines this estimate based on metadata included within the workload processing request. Additionally or alternatively, the system can calculate estimated resources that may be required for a given workload (e.g., based on one or more algorithms, machine learning models, and/or rules) based on the processes associated with the workload processing request. By doing so, the system can efficiently characterize, manage, and distribute requested tasks or processes to associated nodes for efficient processing.

At act 312, based on receiving a second plurality of node identifiers, the cluster management system can configure a worker node group. For example, based on receiving, from the cloud provider, a second plurality of node identifiers, the system generates a worker node group using an operating system image. In disclosed implementations, nodes of the worker node group are associated with the second plurality of node identifiers. For example, the cluster management system configures nodes assigned to the cluster 204 (e.g., nodes 224-1 or 224-2) as worker nodes within a worker node group, based on node identifiers and/or addresses received from the cloud services manager. By doing so, the system sets up the container orchestration system in a manner such that nodes can be controlled and assigned tasks by one or more control plane nodes. As such, the systems disclosed herein enable efficient configuration of container orchestration systems, such as Kubernetes systems, for efficient, autonomous operation within cloud-based systems.

In disclosed implementations, the cluster management system can generate node usage metrics in order to redistribute tasks or processes, and/or manage nodes associated with the container orchestration system, in order to manage provisioned resources more effectively. For example, the system generates a plurality of node usage metrics, where each node usage metric of the plurality of node usage metrics corresponds to a processing unit usage percentage for each node in the worker node group. Based on comparing each node usage metric of the plurality of node usage metrics to a threshold usage metric, the system can transmit, to the cloud provider, a third request for modifying nodes provisioned to the system by the cloud provider. For example, the system tracks node usage over time and determine whether a redistribution or reconfiguration of worker nodes is desirable or required to complete the given workloads. In response to this determination, the system requests, from the cloud provider, a modification of the assigned nodes, thereby improving workload processing efficiency and robustness.

In disclosed implementations, the cluster management system can determine that many nodes are overworked based on the node usage metrics and, in turn, request that the cloud services manager provide additional nodes. For example, the system determines a first number of worker nodes that exhibit node usage metrics of the plurality of node usage metrics greater than the threshold usage metric. Based on comparing the first number of worker nodes to a first maximum threshold number, the system determines a requested number of additional nodes for processing workloads. The system can generate the third request for modifying nodes provisioned to the system by the cloud provider to include the requested number of additional nodes for processing workloads. As an illustrative example, the cluster management system determines a proportion of worker nodes that have processing unit usage percentages that are above a threshold and, as such, request additional resources based on a difference between the threshold number and the number of worker nodes that are overworked. By doing so, the system enables dynamic handling and/or redistribution of workloads to additional nodes in cases where resources provisioned to the container orchestration system are insufficient.

In disclosed implementations, the cluster management system can determine that many nodes are underused based on the node usage metrics and, in turn, request that the cloud services manage deprovision underused nodes. For example, the system determines a second number of worker nodes that exhibit node usage metrics of the plurality of node usage metrics lower than the threshold usage metric. Based on comparing the second number of worker nodes to a second maximum threshold number, the system determines a third number of worker nodes to deactivate. The system can deactivate the third number of worker nodes. As an illustrative example, the cluster management system determines a proportion of worker nodes that have processing unit usage percentages that are below a threshold and, as such, determine to deprovision nodes based on a difference between the threshold number and the number of worker nodes that are underused. By doing so, the system enables dynamic handling and/or redistribution of workloads to other underused nodes in situations where such processes are distributed inefficiently, in order to improve system efficiency and minimize the resources required for the execution of workloads.

In disclosed embodiments, the cluster management system enables updating and/or reinstallation of software associated with worker nodes. For example, the system receives a request for updating the worker node group (e.g., from the user 212). The request for updating the worker node group can include an updated operating system image. The system determines a plurality of inactive worker nodes that are not processing any workloads. Based on identifying a third plurality of node identifiers corresponding to the plurality of inactive worker nodes, the system can update, for nodes associated with the third plurality of node identifiers, virtual machine software to include the updated operating system image. As an illustrative example, the cluster management system receives a request to update software. However, some nodes may be active and, therefore, temporarily unavailable for updates. The system can select only nodes that are inactive for updates, thereby rolling out such updates to worker nodes while mitigating any effects, delays, or errors for workloads that are in process. In some implementations, the system checks for inactive worker nodes periodically in order to update such nodes as and when they are available. Thus, the cluster management system disclosed herein enables dynamic handling of updates to containerized applications (e.g., virtual machines) in container orchestration systems.

Figure 4:
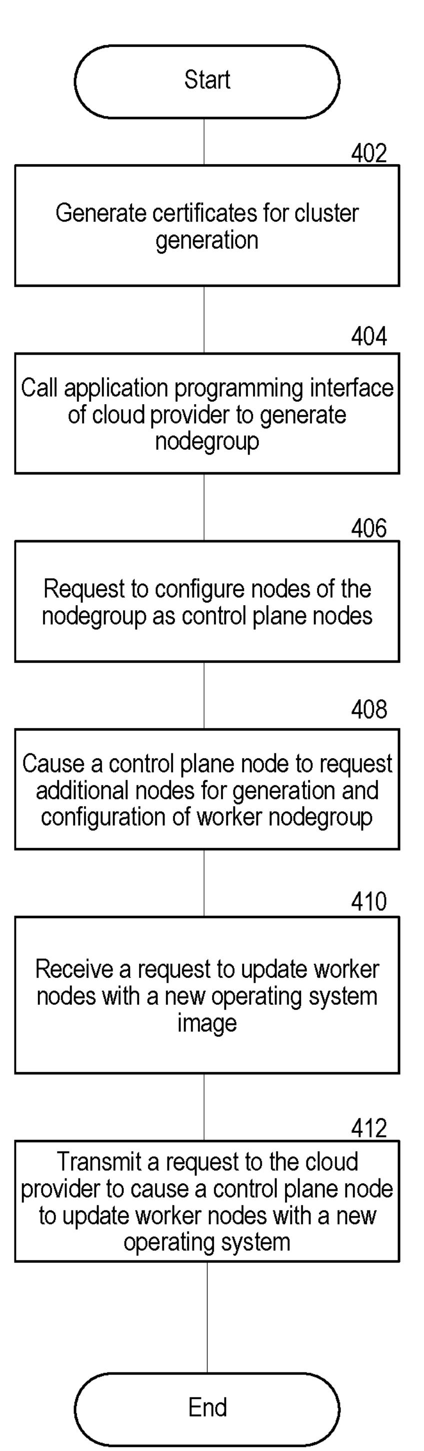
FIG. 4 is a flowchart that illustrates generation of requests for configuration of a control plane node group and of a worker node group.

FIG. 4 depicts a flowchart 400 that illustrates generation of requests for configuration of a control plane node group and of a worker node group. For example, flowchart 400 can be implemented by an electronic device 214 for management of the container orchestration system (e.g., the cluster 204).

At step act, the electronic device 214 can generate certificates for cluster generation, including configuration metadata (e.g., Kubernetes certificates). At act 404, the electronic device 214 can call an API of the cloud provider to generate a nodegroup (e.g., a control plane node group 206). At act 406, the electronic device 214 can generate a request for configuration of nodes of the node group as control plane nodes. At act 408, the electronic device 214 can cause a control plane node (e.g., control plane node 210-1) to request additional nodes for generation and configuration of a worker node group. At act 410, the electronic device 214 can receive a request to update the worker nodes with a new operating system image. At act 412, the electronic device 214 can transmit a request to the cloud provider to cause a control plane node to update worker nodes with a new operating system.

Computer System

Figure 5:
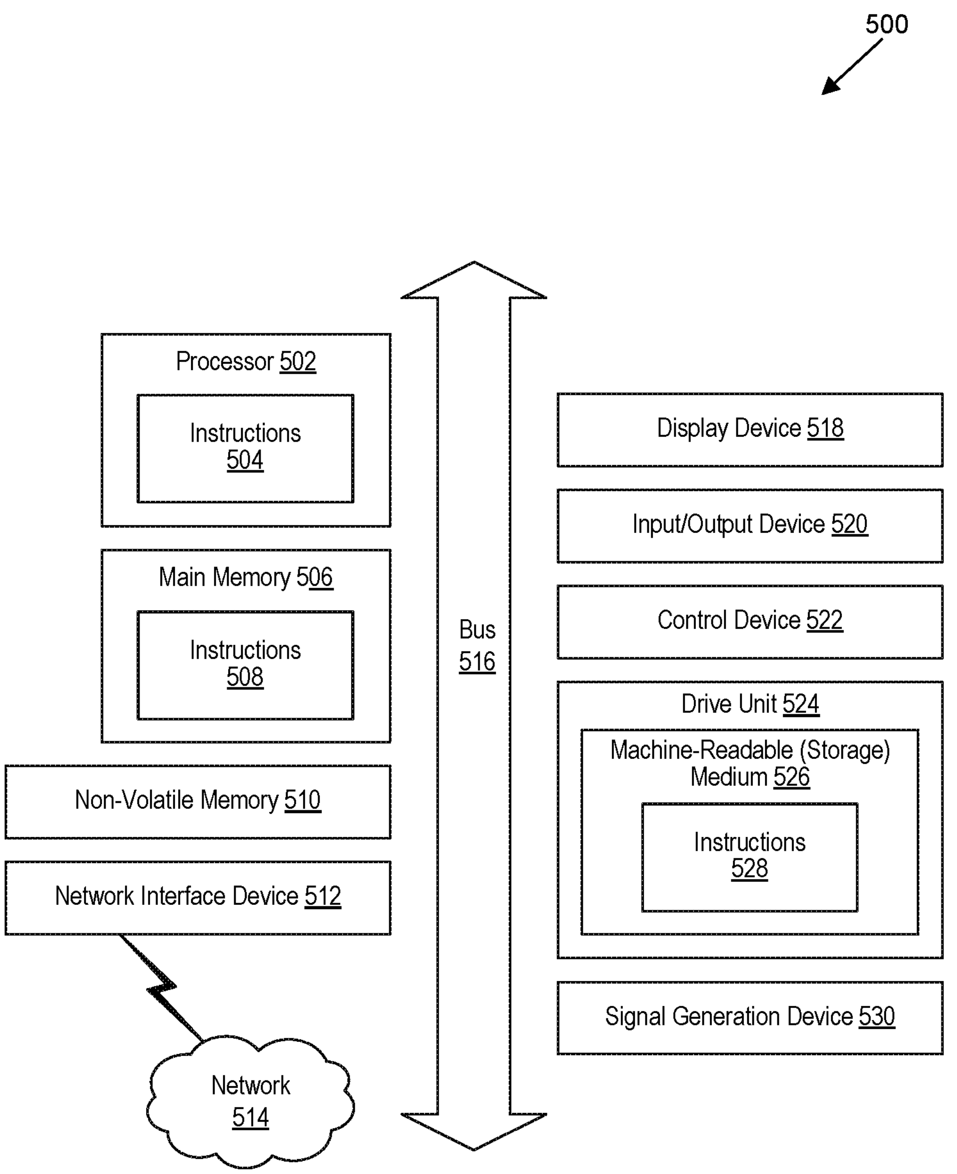
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable/storage medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Wireless Communications System

Figure 6:
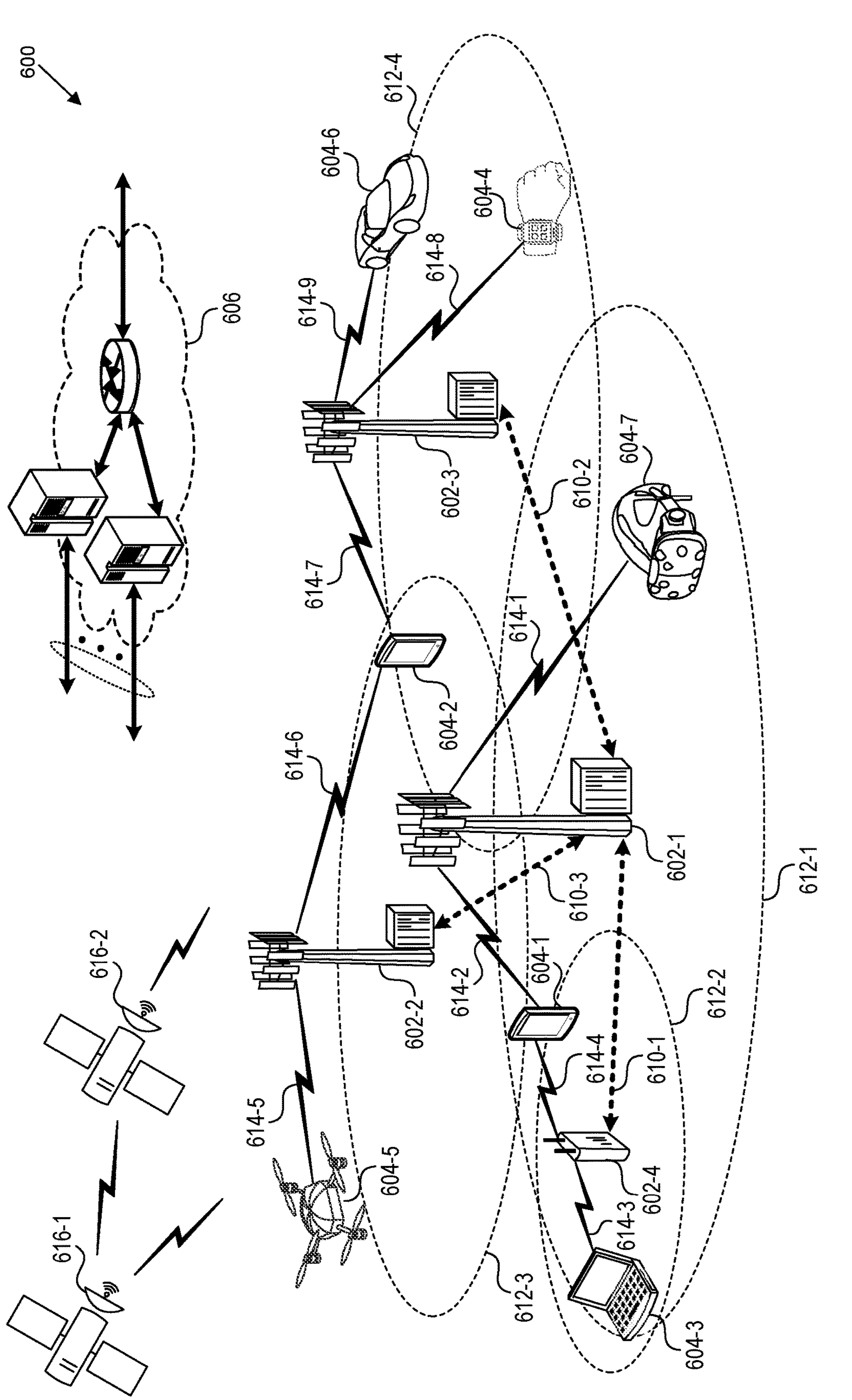
FIG. 6 is a block diagram that illustrates a wireless communications system that can implement aspects of the present technology.

FIG. 6 is a block diagram that illustrates a wireless telecommunications network 600 ("network 600") in which aspects of the disclosed technology are incorporated. The network 600 includes base stations 602-1 through 602-4 (also referred to individually as "base station 602" or collectively as "base stations 602"). A base station is a type of network access node (NAN) that can also be referred to as a cell site, a base transceiver station, or a radio base station. As discussed above, network 600 can include any combination of NANs.

The NANs of a network 600 formed by the network 600 also include wireless devices 604-1 through 604-7 (referred to individually as "wireless device 604" or collectively as "wireless devices 604") and a core network 606. The wireless devices 604-1 through 604-7 can correspond to or include network 600 entities capable of communication using various connectivity standards. For example, a 5G communication channel can use millimeter wave (mmW) access frequencies of 28 GHz or more. In some implementations, the wireless device 604 can operatively couple to a base station 602 over a long-term evolution/long-term evolution-advanced (LTE/LTE-A) communication channel, which is referred to as a 4G communication channel.

The core network 606 provides, manages, and controls security services, user authentication, access authorization, tracking, Internet Protocol (IP) connectivity, and other access, routing, or mobility functions. The base stations 602 interface with the core network 606 through a first set of backhaul links (e.g., S1 interfaces) and can perform radio configuration and scheduling for communication with the wireless devices 604 or can operate under the control of a base station controller (not shown). In some examples, the base stations 602 can communicate with each other, either directly or indirectly (e.g., through the core network 606), over a second set of backhaul links 610-1 through 610-3 (e.g., X1 interfaces), which can be wired or wireless communication links.

The base stations 602 can wirelessly communicate with the wireless devices 604 via one or more base station antennas. The cell sites can provide communication coverage for geographic coverage areas 612-1 through 612-4 (also referred to individually as "coverage area 612" or collectively as "coverage areas 612"). The geographic coverage area 612 for a base station 602 can be divided into sectors making up only a portion of the coverage area (not shown). The network 600 can include base stations of different types (e.g., macro and/or small cell base stations). In some implementations, there can be overlapping geographic coverage areas 612 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 600 can include a 5G network 600 and/or an LTE/LTE-A or other network. In an LTE/LTE-A network, the term eNB is used to describe the base stations 602, and in 5G new radio (NR) networks, the term gNBs is used to describe the base stations 602 that can include mmW communications. The network 600 can thus form a heterogeneous network 600 in which different types of base stations provide coverage for various geographic regions. For example, each base station 602 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 600 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 600 provider. A femto cell covers a relatively smaller geographic area (e.g., a home)

and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 600 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 604 and the base stations 602 or core network 606 supporting radio bearers for the user plane data. At the Physical (PHY) layer, the transport channels are mapped to physical channels.

Wireless devices can be integrated with or embedded in other devices. As illustrated and discussed in relation to FIG. 1, the wireless devices 604 are distributed throughout the system 600, where each wireless device 604 can be stationary or mobile.

A wireless device (e.g., wireless devices 604-1, 604-2, 604-3, 604-4, 604-5, 604-6, and 604-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 600 equipment at the edge of a network 600 including macro eNBs/gNBs, small cell eNBs/gNBs, relay base stations, and the like. A wireless device can also communicate with other wireless devices either within or outside the same coverage area of a base station via device-to-device (D2D) communications.

The communication links 614-1 through 614-9 (also referred to individually as "communication link 614" or collectively as "communication links 614") shown in network 600 include uplink (UL) transmissions from a wireless device 604 to a base station 602, and/or downlink (DL) transmissions from a base station 602 to a wireless device 604. The downlink transmissions can also be called forward link transmissions while the uplink transmissions can also be called reverse link transmissions. Each communication link 614 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 614 can transmit bidirectional communications using frequency division duplex (FDD) (e.g., using paired spectrum resources) or Time division duplex (TDD) operation (e.g., using unpaired spectrum resources). In some implementations, the communication links 614 include LTE and/or mmW communication links.

In some implementations of the network 600, the base stations 602 and/or the wireless devices 604 include multiple antennas for employing antenna diversity schemes to improve communication quality and reliability between base stations 602 and wireless devices 604. Additionally or alternatively, the base stations 602 and/or the wireless devices 604 can employ multiple-input, multiple-output (MIMO) techniques that can take advantage of multi-path environments to transmit multiple spatial layers carrying the same or different coded data.

In some examples, the network 600 implements 6G technologies including increased densification or diversification of network nodes. The network 600 can enable terrestrial and non-terrestrial transmissions. In this context, a Non-Terrestrial Network (NTN) is enabled by one or more satellites such as satellites 616-1 and 616-2 to deliver services anywhere and anytime and provide coverage in areas that are unreachable by any conventional Terrestrial Network (TN). A 6G implementation of the network 600 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 600 can implement a converged Radio Access Network (RAN) and Core architecture to achieve Control and User Plane Separation (CUPS) and achieve extremely low User Plane latency. In yet another example of 6G, the network 600 can implement a converged Wi-Fi and Core architecture to increase and improve indoor coverage.

The network 100 can enable terrestrial and non-terrestrial transmissions. In this context, a Non-Terrestrial Network (NTN) is enabled by one or more satellites such as satellite 118 to deliver services anywhere and anytime and provide coverage in areas that are unreachable by any conventional Terrestrial Network (TN). In some implementations, satellite 118 can communicate with one or more electronic devices 116-1 and/or 116-2. For example, satellite 118 communicates with the cloud 102 through one or more NANs, without communicating through electronic devices.

5G Core Network Functions

Figure 7:
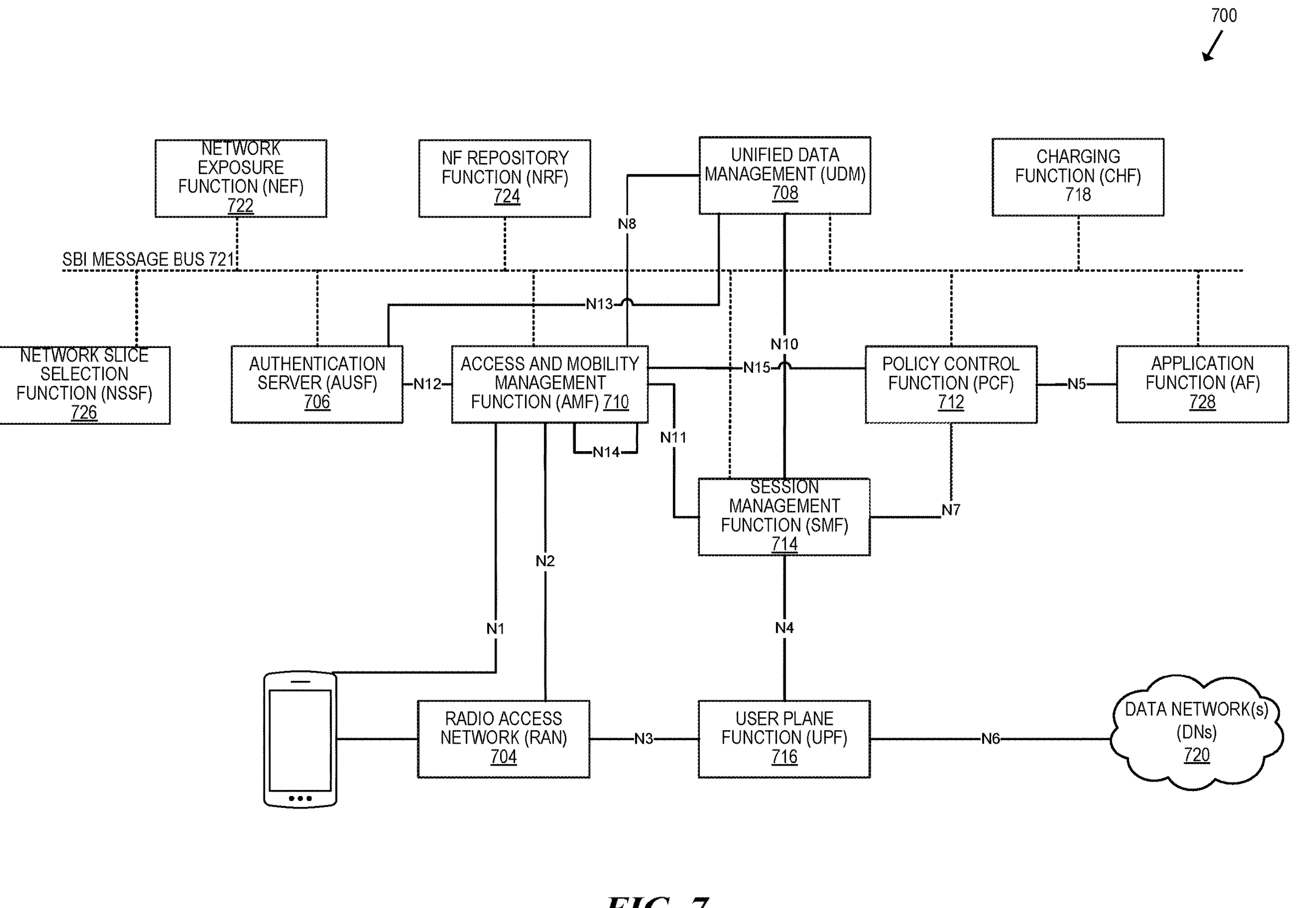
FIG. 7 is a block diagram that illustrates 5G core network functions (NFs) that can implement aspects of the present technology.

FIG. 7 is a block diagram that illustrates an architecture 700 including 5G core network functions (NFs) that can implement aspects of the present technology. A wireless device 702 can access the 5G network through a NAN (e.g., gNB) of a RAN 704. The NFs include an Authentication Server Function (AUSF) 706, a Unified Data Management (UDM) 708, an Access and Mobility management Function (AMF) 710, a Policy Control Function (PCF) 712, a Session Management Function (SMF) 714, a User Plane Function (UPF) 716, and a Charging Function (CHF) 718.

The interfaces N1 through N15 define communications and/or protocols between each NF as described in relevant standards. The UPF 716 is part of the user plane and the AMF 710, SMF 714, PCF 712, AUSF 706, and UDM 708 are part of the control plane. One or more UPFs can connect with one or more data networks (DNs) 270. The UPF 716 can be deployed separately from control plane functions. The NFs of the control plane are modularized such that they can be scaled independently. As shown, each NF service exposes its functionality in a Service Based Architecture (SBA) through a Service Based Interface (SBI) 721 that uses HTTP/2. The SBA can include a Network Exposure Function (NEF) 722, a NF Repository Function (NRF) 724 a Network Slice Selection Function (NSSF) 726, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 724, which maintains a record of available NF instances and supported services. The NRF 724 allows other NF instances to subscribe and be notified of registrations from NF instances of a given type. The NRF 724 supports service discovery by receipt of discovery requests from NF instances and, in response, details which NF instances support specific services.

The NSSF 726 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 702 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 708 and then requests an appropriate network slice of the NSSF 726.

The UDM 708 introduces a User Data Convergence (UDC) that separates a User Data Repository (UDR) for storing and managing subscriber information. As such, the UDM 708 can employ the UDC under 3GPP TS 22.101 to support a layered architecture that separates user data from application logic. The UDM 708 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 708 can contain voluminous amounts of data that is accessed for authentication. Thus, the UDM 708 is analogous to a Home Subscriber Server (HSS), to provide authentication credentials while being employed by the AMF 710 and SMF 714 to retrieve subscriber data and context.

The PCF 712 can connect with one or more application functions (AFs) 728. The PCF 712 supports a unified policy framework within the 5G infrastructure for governing network behavior. The PCF 712 accesses the subscription information required to make policy decisions from the UDM 708, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 724. This allows the SCP to become the delegated discovery point in a datacenter, offloading the NRF 724 from distributed service meshes that make-up a network operator's infrastructure. Together with the NRF 724, the SCP forms the hierarchical 5G service mesh.

The AMF 710 receives requests and handles connection and mobility management while forwarding session management requirements over the N11 interface to the SMF 714. The AMF 710 determines that the SMF 714 is best suited to handle the connection request by querying the NRF 724. That interface and the N11 interface between the AMF 710 and the SMF 714 assigned by the NRF 724, use the SBI 721. During session establishment or modification, the SMF 714 also interacts with the PCF 712 over the N7 interface and the subscriber profile information stored within the UDM 708. Employing the SBI 721, the PCF 712 provides the foundation of the policy framework which, along with the more typical QoS and charging rules, includes Network Slice selection, which is regulated by the NSSF 726.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A system for flexibly managing workloads on Kubernetes clusters, the system comprising:
- a non-transitory, computer-readable medium storing instructions that are executable by one or more processors; and
- a first node provisioned by a cloud provider, designated as a control plane node, and configured to:
  - prior to receiving a workload processing request:
    - receive, from a user device, a cluster generation request comprising cluster creation information including at least one of (1) a number of nodes requested, (2) a node-type request, or (3) cluster storage requirements;
    - determine that the cluster generation request is missing information for cluster creation;
    - in response to determining that the cluster generation request is missing information, generate a user request for the user device to request the missing information;
    - transmit, based on the cluster generation request and the missing information responsive to the user request, a first request for at least one additional node provisioned by the cloud provider,
      - wherein the first request includes at least one of: a certificate, a request for a node load-balancer, one or more binaries, or control plane network connection information;
    - receive, from the cloud provider, a first set of one or more node addresses identifying available nodes that are provisioned by the cloud provider based on the first request;
    - provision a control plane node group comprising the first node and nodes with addresses corresponding to the first set of one or more node addresses;
    - configure control plane network connections between control plane nodes of the control plane node group including the first node;
  - receive, via the one or more processors, the workload processing request, wherein the workload processing request comprises an indication of one or more requested processes;
  - generate an estimate of required resources for the workload processing request;
  - based on the generated estimate of required resources for the workload processing request, transmit, to the cloud provider, a second request for at least one worker node,
    - wherein the second request for at least one worker node comprises the estimate of required resources; and
  - based on receiving, from the cloud provider and in response to the second request, a second plurality of node addresses, generate a worker node group using an operating system image,
    - wherein the worker node group enables processing at least some of the requested processes of the workload processing request, and wherein nodes of the worker node group are associated with the second plurality of node addresses.

2. The system of claim 1, wherein the first node is configured to:
- generate a plurality of node usage metrics,
  - wherein each node usage metric of the plurality of node usage metrics corresponds to a processing unit usage percentage for each node in the worker node group; and
- based on comparing each node usage metric of the plurality of node usage metrics to a threshold usage metric, transmit, to the cloud provider, a third request for modifying nodes provisioned to the system by the cloud provider.

3. The system of claim 2, wherein the first node is configured to:
- determine a first number of worker nodes that exhibit node usage metrics of the plurality of node usage metrics greater than the threshold usage metric;
- based on comparing the first number of worker nodes to a first maximum threshold number, determine a requested number of additional nodes for processing workloads; and generate the third request for modifying nodes provisioned to the system by the cloud provider to include the requested number of additional nodes for processing workloads.

4. The system of claim 2, wherein the first node is configured to:

determine a second number of worker nodes that exhibit node usage metrics of the plurality of node usage metrics lower than the threshold usage metric;

based on comparing the second number of worker nodes to a second maximum threshold number, determine a third number of worker nodes to deactivate; and deactivate the third number of worker nodes.

5. The system of claim 1, wherein the first node is configured to:

receive a request for updating the worker node group, wherein the request for updating the worker node group comprises an updated operating system image;

determine a plurality of inactive worker nodes, wherein the plurality of inactive worker nodes are not processing any workloads; and based on identifying a third plurality of node identifiers corresponding to the plurality of inactive worker nodes, update, for nodes associated with the third plurality of node identifiers, virtual machine software to include the updated operating system image.

6. The system of claim 1, wherein the first node is configured to:

receive, from the one or more processors, a request for generation of a cluster of virtual machines, wherein the request for generation of the cluster of virtual machines comprises configuration metadata;

extract, from the configuration metadata, a number of requested control plane nodes; and based on comparing the number of requested control plane nodes with a number of the nodes available for use, transmit, to the cloud provider, the first request for at least one additional node.

7. The system of claim 6, wherein the first node is configured to:

extract, from the configuration metadata, a type of requested control plane nodes; and based on comparing the type of requested control plane nodes with a type of the nodes available for use, transmit a third request to the cloud provider for additional nodes of the type of requested control plane nodes.

8. A system for flexibly managing workloads using a cloud services manager, the system comprising:

a first node comprising a hardware or virtual machine associated with at least one of memory, storage, or computational power, wherein the first node is provisioned by a cloud provider, is external to a control plane node group, and is configured to:

prior to receiving a workload processing request:

receive, from a user device, a cluster generation request comprising cluster creation information including at least one of (1) a number of nodes requested, (2) a node-type request, or (3) cluster storage requirements;

determine that the cluster generation request is missing information for cluster creation;

in response to determining that the cluster generation request is missing information, generate a user request for the user device to request the missing information;

transmit, based on the cluster generation request and the missing information responsive to the user request, a first request for at least one additional node from the cloud provider, wherein the first request includes at least one of: a certificate, a request for a node load-balancer, one or more binaries, or control plane network connection information;

based on the first request, receive, from the cloud provider, a first set of one or more node addresses identifying available nodes;

configure control plane network connections between control plane nodes of the control plane node group not including the first node, wherein the control plane node group comprises the nodes with addresses corresponding to the first set of one or more node addresses;

receive the workload processing request, wherein the workload processing request comprises an indication of requested processes to be executed;

based on generating an estimate of required resources for the workload processing request, transmit, to the cloud provider, a second request for at least one worker node, based on receiving, from the cloud provider and in response to the second request, a second plurality of node addresses, generate a worker node group using an operating system image, wherein nodes of the worker node group are associated with the second plurality of node addresses.

9. The system of claim 8, wherein the first node is configured to:

generate a plurality of node usage metrics, wherein each node usage metric of the plurality of node usage metrics corresponds to a processing unit usage percentage for each node in the worker node group; and based on comparing each node usage metric of the plurality of node usage metrics to a threshold usage metric, transmit, to the cloud provider, a third request for modifying nodes provisioned to the system by the cloud provider.

10. The system of claim 9, wherein the first node is configured to:

determine a first number of worker nodes that exhibit node usage metrics of the plurality of node usage metrics greater than the threshold usage metric;

based on comparing the first number of worker nodes to a first maximum threshold number, determine a requested number of additional nodes for processing workloads; and generate the third request for modifying nodes provisioned to the system by the cloud provider to include the requested number of additional nodes for processing workloads.

11. The system of claim 9, wherein the first node is configured to:

determine a second number of worker nodes that exhibit node usage metrics of the plurality of node usage metrics lower than the threshold usage metric;

based on comparing the second number of worker nodes to a second maximum threshold number, determine a third number of worker nodes to deactivate; and deactivate the third number of worker nodes.

12. The system of claim 8, wherein the first node is configured to:

receive a request for updating the worker node group, wherein the request for updating the worker node group comprises an updated operating system image;

determine a plurality of inactive worker nodes, wherein the plurality of inactive worker nodes are not processing any workloads; and based on identifying a third plurality of node identifiers corresponding to the plurality of inactive worker nodes, update, for nodes associated with the third plurality of node identifiers, virtual machine software to include the updated operating system image.

13. The system of claim 8, wherein the first node is configured to:

receive a request for generation of a cluster of virtual machines, wherein the request for generation of the cluster of virtual machines comprises configuration metadata;

extract, from the configuration metadata, a number of requested control plane nodes; and based on comparing the number of requested control plane nodes with a number of the nodes available for use, transmit, to the cloud provider, the first request for at least one additional node.

14. The system of claim 13, wherein the first node is configured to:

extract, from the configuration metadata, a type of requested control plane nodes; and based on comparing the type of requested control plane nodes with a type of the nodes available for use, transmit a third request to the cloud provider for additional nodes of the type of requested control plane nodes.

15. A method performed by a first node comprising a hardware or virtual machine associated with at least one of memory, storage, or computational power, the method comprising:

prior to receiving a workload processing request:

receiving, from a user device, a cluster generation request comprising cluster creation information including at least one of (1) a number of nodes requested, (2) a node-type request, or (3) cluster storage requirements;

determining that the cluster generation request is missing information for cluster creation;

in response to determining that the cluster generation request is missing information, generating a user request for the user device to request the missing information;

transmitting, based on the cluster generation request and the missing information responsive to the user request, a first request for at least one node from a cloud provider, wherein the first request includes at least one of: a certificate, a request for a node load-balancer, one or more binaries, or control plane network connection information;

based on the first request, receiving, from the cloud provider, a first set of one or more node identifiers identifying available nodes;

configuring control plane network connections between control plane nodes of a control plane node group not including the first node, wherein the control plane node group comprises nodes with addresses corresponding to the first set of one or more node identifiers;

receiving the workload processing request, wherein the workload processing request comprises an indication of requested processes to be executed;

transmitting, to the cloud provider, a second request for at least one worker node using a generated estimate of required resources for the workload processing request;

configuring, based on the generated estimate, a worker node group to process workloads using a second plurality of node identifiers received from the cloud provider, wherein nodes of the worker node group are associated with the second plurality of node identifiers.

16. The method of claim 15, comprising:

generating a plurality of node usage metrics, wherein each node usage metric of the plurality of node usage metrics corresponds to a processing unit usage percentage for each node in the worker node group; and based on comparing each node usage metric of the plurality of node usage metrics to a threshold usage metric, transmitting, to the cloud provider, a third request for modifying available nodes for processing workloads.

17. The method of claim 16, comprising:

determining a first number of worker nodes that exhibit node usage metrics of the plurality of node usage metrics greater than the threshold usage metric;

based on comparing the first number of worker nodes to a first maximum threshold number, determining a requested number of additional nodes for processing workloads; and generating the third request for modifying available nodes for processing workloads to include the requested number of additional nodes for processing workloads.

18. The method of claim 16, comprising:

determining a second number of worker nodes that exhibit node usage metrics of the plurality of node usage metrics lower than the threshold usage metric;

based on comparing the second number of worker nodes to a second maximum threshold number, determining a third number of worker nodes to deactivate; and deactivating the third number of worker nodes.

19. The method of claim 15, comprising:

receiving a request for updating the worker node group, wherein the request for updating the worker node group comprises an updated operating system image;

determining a plurality of inactive worker nodes, wherein the plurality of inactive worker nodes are not processing any workloads; and based on identifying a third plurality of node identifiers corresponding to the plurality of inactive worker nodes, updating, for nodes associated with the third plurality of node identifiers, virtual machine software to include the updated operating system image.

20. The method of claim 15, comprising:

receiving a request for generation of a cluster of virtual machines, wherein the request for generation of the cluster of virtual machines comprises configuration metadata;

extracting, from the configuration metadata, a number of requested control plane nodes; and based on comparing the number of requested control plane nodes with a number of the nodes available for use, transmitting, to the cloud provider, the first request for at least one node.

* * * * *